(No Model.)
J. P. EUSTIS.
COOKING OR CULINARY VESSEL.
No. 476,137. Patented May 31, 1892.
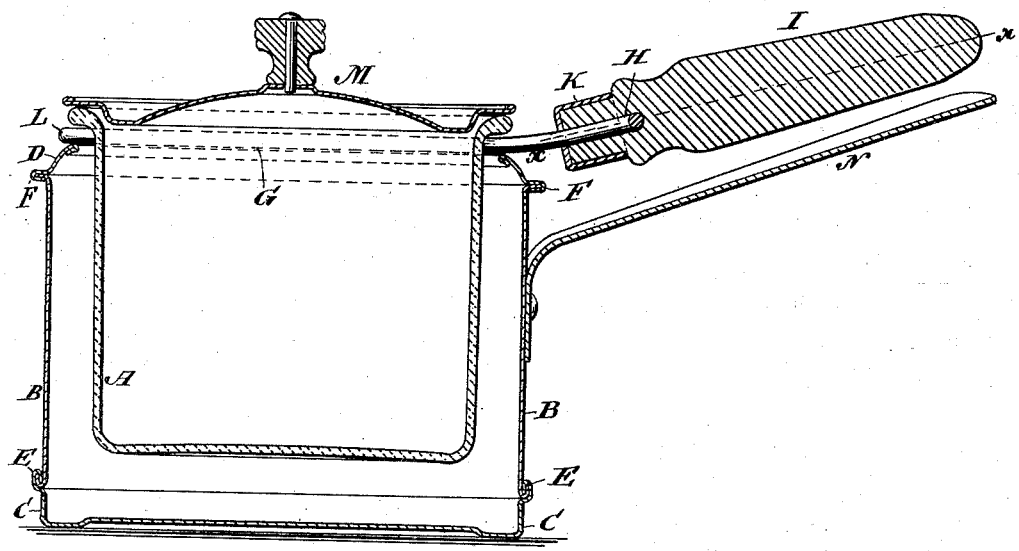
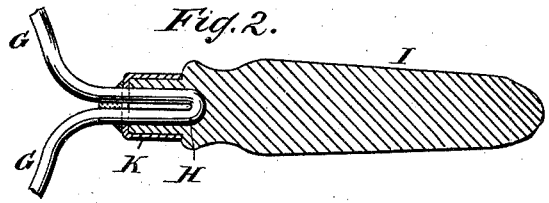
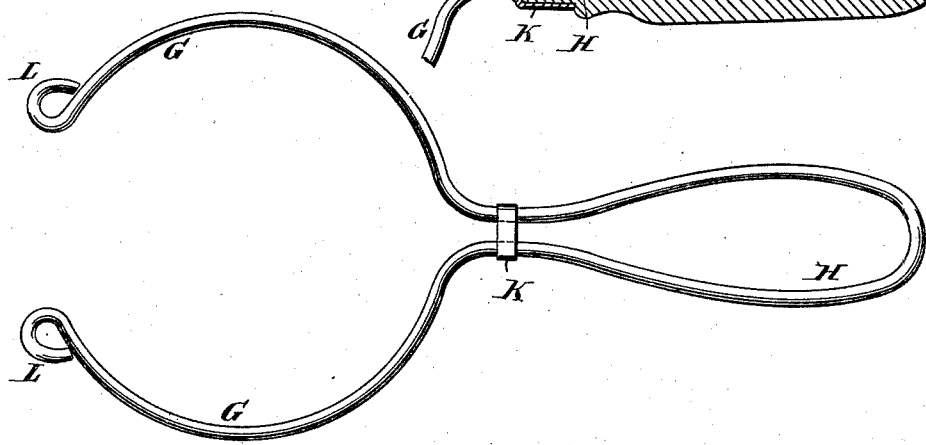
WITNESSES:
Edward Wolff
William L. Miller
INVENTOR:
John P. Eustis.
BY
Van Santvoord & Hauff
ATTORNEYS

UNITED STATES PATENT OFFICE.

JOHN P. EUSTIS, OF NEW YORK, N. Y.

COOKING OR CULINARY VESSEL.

SPECIFICATION forming part of Letters Patent No. 476,137, dated May 31, 1892.

Application filed June 11, 1891. Serial No. 395,907. (No model.)

*To all whom it may concern:*

Be it known that I, JOHN P. EUSTIS, a citizen of the United States, residing at New York, in the county and State of New York, have invented new and useful Improvements in Cooking or Culinary Vessels, of which the following is a specification.

This invention relates to an improvement in culinary or cooking vessels; and the invention consists in the details of construction set forth in the following specification and claims, and illustrated in the annexed drawings, in which—

Figure 1 is a sectional side elevation of a cooking-vessel. Fig. 2 is a section of a handle along $xx$, Fig. 1. Fig. 3 shows a modification.

The utensil is shown composed of two vessels, an inner vessel A and an outer supporting-vessel. The outer vessel is shown composed of a body B, a bottom C, and a breast D. The outer vessel has its body and bottom connected by a seam E. This seam is located some distance above the lower edge, so that when the outer vessel is emptied water is not liable to settle in the seam E and corrosion or rusting of the seam is avoided. The breast D and body B are seamed together at F. By constructing the breast, body, and bottom of separate pieces the outer vessel can be made economically and with great saving of stock. The inner vessel A rests upon or is suspended from the breast D. The body B of the outer vessel is extended straight up from the bottom to the breast, so as to give considerable water-space surrounding the inner vessel. The inner vessel is shown provided with a spring-clamp G, having a handle portion H, made of one piece of material with the clamp. The handle portion H may either be provided with a cover or handle I of wood, or said handle portion may be extended in form of a handle, as seen in Fig. 3. A metal ring or ferrule K prevents spreading of the handle portion H. The free ends of the clamp G are bent into eyes L. The eyes enable the free ends of the clamp to be readily grasped without danger of scratching or injuring the fingers when the clamp is to be spread for removing or inserting the vessel A into the clamp. The eyes L and handle portion H serve to support or suspend the inner vessel when in place in the outer vessel. The inner vessel can be provided with a cover M and a handle N can be secured to the outer vessel.

What I claim as new, and desire to secure by Letters Patent, is—

1. The combination, with an outer supporting-vessel, of an inner vessel having a plain or smooth body or side and a spring-clamp for said inner vessel, said spring-clamp being provided with a handle portion and said handle portion and spring-clamp being rigidly connected or formed of one piece and being confined to and located wholly at the upper part of the inner vessel, said spring-clamp being located outside the boundary of the side or body of the inner vessel, so as to project therefrom and rest upon the exterior of the upper rim of the outer vessel, substantially as described.

2. The combination, with an outer supporting-vessel having a handle made to extend from one side thereof, of an inner vessel having a plain or smooth body or side and provided with a clamp rigidly connected to or formed in one piece, with a handle portion made to correspond with or sit upon the handle of the outer vessel, said clamp being located at the upper part of the inner vessel and outside the boundary of the side or body of the inner vessel, so as to project therefrom and sit or rest upon the exterior of the upper rim of the outer vessel, substantially as described.

In testimony whereof I have hereunto set my hand in the presence of two subscribing witnesses.

JOHN P. EUSTIS.

Witnesses:
CHRIS. SMITH,
JAMES W. EUSTIS.